(12) United States Patent
Stockton et al.

(10) Patent No.: US 10,387,814 B2
(45) Date of Patent: *Aug. 20, 2019

(54) SERVER FOR SELECTING A SEQUENTIAL TASK-ORIENTED EVENT AND METHODS FOR USE THEREWITH

(71) Applicant: Planet Social, LLC, Austin, TX (US)

(72) Inventors: Michelle Stockton, Austin, TX (US); Judith Stuckman, Austin, TX (US); Christine Laramy, Austin, TX (US); Bruce Edward Stuckman, Austin, TX (US)

(73) Assignee: Planet Social, LLC, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/158,489

(22) Filed: Oct. 12, 2018

(65) Prior Publication Data

US 2019/0042993 A1    Feb. 7, 2019

Related U.S. Application Data

(63) Continuation of application No. 15/822,266, filed on Nov. 27, 2017, now Pat. No. 10,129,369, which is a
(Continued)

(51) Int. Cl.
| | |
|---|---|
| *G06F 15/173* | (2006.01) |
| *G06Q 10/06* | (2012.01) |
| *G06F 3/0482* | (2013.01) |
| *G06Q 10/10* | (2012.01) |
| *H04W 4/02* | (2018.01) |
| *H04L 29/08* | (2006.01) |
| *G06Q 30/02* | (2012.01) |
| *H04L 29/06* | (2006.01) |

(Continued)

(52) U.S. Cl.
CPC ..... *G06Q 10/06313* (2013.01); *G06F 3/0482* (2013.01); *G06Q 10/109* (2013.01); *G06Q 10/1095* (2013.01); *G06Q 30/0241* (2013.01); *G06Q 50/01* (2013.01); *H04L 67/18* (2013.01); *H04L 67/34* (2013.01); *H04L 67/42* (2013.01); *H04W 4/02* (2013.01); *G06Q 30/0252* (2013.01); *H04L 51/32* (2013.01); *H04W 88/02* (2013.01)

(58) Field of Classification Search
CPC ........... G06Q 10/06313; G06Q 10/109; G06Q 10/1095; G06F 3/0482; H04L 67/18; H04L 67/34; H04L 67/84

See application file for complete search history.

(56) References Cited

U.S. PATENT DOCUMENTS

| | | | |
|---|---|---|---|
| 5,754,759 A * | 5/1998 | Clarke ................. | G06F 11/3466 714/31 |
| 7,774,221 B2 | 8/2010 | Miller et al. | |

(Continued)

*Primary Examiner* — Thanh T Nguyen
(74) *Attorney, Agent, or Firm* — Garlick & Markison; Bruce E. Stuckman

(57) ABSTRACT

An event wizard server includes at least one processor that executes the event wizard server application that bidirectionally communicates event planning data with a user of a client device via a network interface. The event planning data includes: event type menu data, and event type selection data, wherein at least one event type includes a sequential task-oriented event.

20 Claims, 17 Drawing Sheets

Related U.S. Application Data continuation of application No. 15/413,755, filed on Jan. 24, 2017, now Pat. No. 9,860,343, which is a continuation of application No. 14/029,217, filed on Sep. 17, 2013, now Pat. No. 9,600,144.

(60) Provisional application No. 61/727,221, filed on Nov. 16, 2012.

(51) Int. Cl.
    *G06Q 50/00* (2012.01)
    *H04W 88/02* (2009.01)
    *H04L 12/58* (2006.01)

(56) References Cited

U.S. PATENT DOCUMENTS

| | | | |
|---|---|---|---|
| 7,822,628 B2 | 10/2010 | Brady et al. | |
| 9,177,267 B2 | 11/2015 | Kass et al. | |
| 9,253,513 B1* | 2/2016 | Finster | G06Q 30/0251 |
| 9,253,615 B2 | 2/2016 | Ickman et al. | |
| 9,413,835 B2 | 8/2016 | Chen et al. | |
| 9,704,205 B2 | 7/2017 | Akutagawa et al. | |
| 9,967,365 B2 | 5/2018 | Mullin | |
| 2002/0128934 A1 | 9/2002 | Shaer | |
| 2002/0156787 A1 | 10/2002 | Jameson et al. | |
| 2003/0200254 A1 | 10/2003 | Wei | |
| 2004/0006649 A1* | 1/2004 | Cirne | G06F 9/451 719/310 |
| 2004/0008253 A1 | 1/2004 | Monroe | |
| 2004/0145481 A1 | 7/2004 | Dilbeck et al. | |
| 2005/0120160 A1* | 6/2005 | Plouffe | G06F 9/45537 711/1 |
| 2006/0041446 A1 | 2/2006 | Aaron | |
| 2006/0061795 A1* | 3/2006 | Walmsley | G06F 21/73 358/1.14 |
| 2006/0067592 A1* | 3/2006 | Walmsley | B41J 2/2139 382/303 |
| 2006/0072952 A1* | 4/2006 | Walmsley | B41J 2/155 400/62 |
| 2006/0087525 A1* | 4/2006 | Jackson Pulver | B41J 2/04541 347/12 |
| 2006/0092205 A1* | 5/2006 | Jackson Pulver | B41J 2/04505 347/13 |
| 2006/0092222 A1* | 5/2006 | Jackson Pulver | B41J 2/155 347/43 |
| 2006/0098042 A1* | 5/2006 | Silverbrook | B41J 2/145 347/40 |
| 2006/0098044 A1* | 5/2006 | Jackson Pulver | B41J 2/04505 347/43 |
| 2006/0100912 A1 | 5/2006 | Kumar et al. | |
| 2006/0125854 A1* | 6/2006 | Jackson Pulver | B41J 2/04505 347/9 |
| 2006/0125855 A1* | 6/2006 | Silverbrook | G06K 15/102 347/9 |
| 2007/0083409 A1 | 4/2007 | Dilbeck et al. | |
| 2007/0233736 A1 | 10/2007 | Xiong et al. | |
| 2010/0188205 A1 | 7/2010 | Dilbeck | |
| 2012/0054246 A1 | 3/2012 | Fischer | |
| 2012/0136689 A1 | 5/2012 | Ickman et al. | |
| 2012/0238256 A1 | 9/2012 | Kim et al. | |
| 2013/0159270 A1 | 6/2013 | Urmy et al. | |
| 2013/0253889 A1 | 9/2013 | Baker et al. | |
| 2014/0011478 A1 | 1/2014 | Collins et al. | |
| 2014/0089418 A1 | 3/2014 | Davenport et al. | |
| 2014/0143312 A1 | 5/2014 | Stockton et al. | |
| 2015/0248651 A1 | 9/2015 | Akutagawa et al. | |

\* cited by examiner

SERVER FOR SELECTING A SEQUENTIAL TASK-ORIENTED EVENT AND METHODS FOR USE THEREWITH

CROSS REFERENCE TO RELATED PATENTS

The present U.S. Utility Patent Application claims priority pursuant to 35 U.S.C. § 120 as a continuation of U.S. Utility application Ser. No. 15/822,266, entitled "SERVER FOR SELECTING A SEQUENTIAL TASK-ORIENTED EVENT AND METHODS FOR USE THEREWITH", filed Nov. 27, 2017, which is a continuation of U.S. Utility application Ser. No. 15/413,755, entitled "SERVER FOR SELECTING A SEQUENTIAL TASK-ORIENTED EVENT AND METHODS FOR USE THEREWITH", filed Jan. 24, 2017, issued as U.S. Pat. No. 9,860,343 on Jan. 2, 2018, which is a continuation of U.S. Utility application Ser. No. 14/029,217, entitled "SERVER FOR SELECTING A SEQUENTIAL TASK-ORIENTED EVENT AND METHODS FOR USE THEREWITH", filed Sep. 17, 2013, issued as U.S. Pat. No. 9,600,144 on Mar. 21, 2017, which claims priority pursuant to 35 U.S.C. § 119(e) to U.S. Provisional Application No. 61/727,221, entitled "EVENT WIZARD SERVER AND METHODS FOR USE THEREWITH", filed Nov. 16, 2012, all of which are hereby incorporated herein by reference in their entirety and made part of the present U.S. Utility Patent Application for all purposes.

TECHNICAL FIELD OF THE INVENTION

The present invention relates to knowledge based systems used in conjunction with client/server network architectures.

DESCRIPTION OF RELATED ART

Planning a large social event such as a wedding can be an arduous process. There are many details that must be taken care of. This has led to the creation of specialized wedding planner services that involve professional wedding planner personnel that lead a bridge and groom through the required planning and decision making including the selection of vendors, materials and services. Though not as common, professional party planners can provide similar services for other events, particularly large events and functions that justify the cost of these services.

Evite is a social planning website that allows a user to create, send and manage online invitations to an event. A user creates online invitations ("Evites") by entering e-mail addresses of prospective guests. The website automatically sends e-mails to the guests that contain the Evites. Each guest can respond by selecting a response such as: "Attending", "Not Attending", "Maybe", and "Not yet replied". Guests can also write additional comments, such as info for other guests, regrets, etc.

The limitations and disadvantages of conventional and traditional approaches will become apparent to one of ordinary skill in the art through comparison of such systems with the present invention.

DETAILED DESCRIPTION OF THE INVENTION INCLUDING THE PRESENTLY PREFERRED EMBODIMENTS

Figure 1:
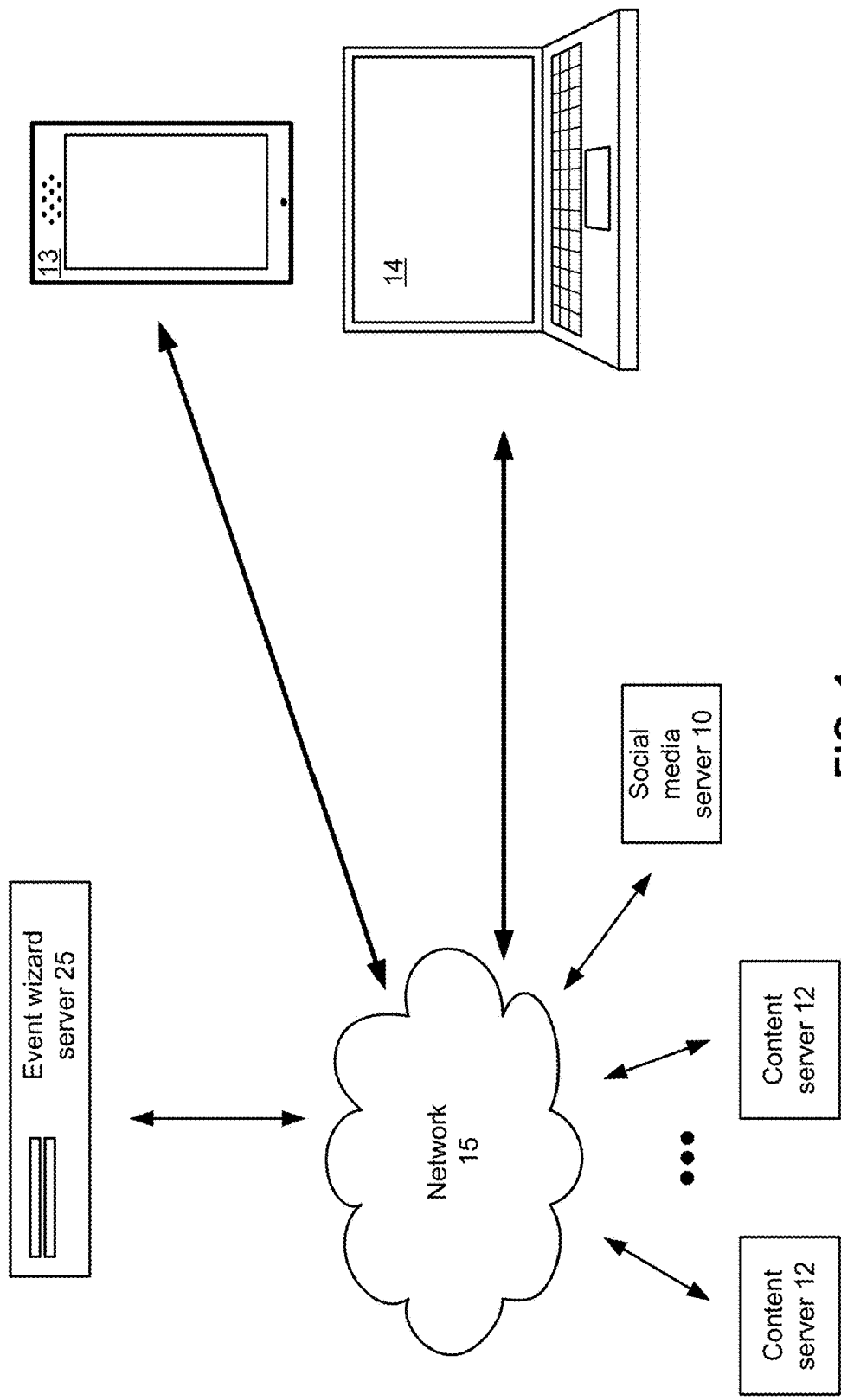
FIG. 1 presents a pictorial representation of an event wizard server 25 and example devices 13-14 that operate in accordance with embodiments of the present invention.

FIG. 1 presents a pictorial representation of an event wizard server 25 and example devices 13-14 that operate in accordance with embodiments of the present invention. In particular, an event wizard server 25 is presented that communicates with client devices such as mobile terminal 13 and personal computer 14 via network 15. The network 15 can be the Internet or other wide area communication network. The event wizard server 25 presents a website that operates via a browser application of mobile terminal 13 and/or personal computer 14 or that otherwise operates in conjunction with an application such as a mobile application to present a knowledge-based wizard process that leads a user through multiple prompts and steps to plan, implement and/or manage a social event such as: a Birthday Party, Anniversary, Dinner Party, Cocktail Party, Wedding and Reception, Baby Shower, Wedding Shower, Social Gathering, Fundraising event, Graduation Party, Bachelor Party, Bachelorette Party, Housewarming Party, Holiday Party (Christmas, New Years, Super Bowl, Valentines, Mardi Gras, Independence Day, etc. . . . ), Pot Luck Party.

In an embodiment, the event planning process begins with a user registering with the event wizard server 25, such as via an email address, and password. Event data in the form of prompts is presented to the client device for display relating to various options to be selected by the user for the event to be planned. Based on the type of event, the prompts direct the user towards a fully completed party or event. For example, the options can include a budget selected by the user, optionally with guidance from the wizard based on the type of event and other options. The event wizard server 25 can optionally issue notifications when user is within certain amount of reaching budget limit, present the budget impact of particular options and adjust the budget based on selection.

In an embodiment, the event wizard server 25 communicates with one or more content servers 12. These content servers 12 can be an invitation server such as Evite; a social networking server such as Facebook, MySpace, Twitter; an advertising server; and other servers that provide information on various event planning options including vendors, event supplies, equipment and other services pertaining to the food, drinks, entertainment, decorations, venues, etc. Information relating to an event to be planned can be stored in a database associated with the server or retrieved by the event wizard server 25 from the content server or servers 12 and/or social media server 10 via network 15 and presented to the client device 13 or 14 as event data for selection by the user.

The social media server 10, can be a web server or server that supports a social media application or otherwise provides a social media site such as Facebook, LinkedIn or Twitter or a web-based messaging service such as Gmail, Yahoo mail, etc. that has an account associated with the user. While shown as a separate device, the functionality of event wizard server 25 can be implemented in or on conjunction with the social media server 10.

Event wizard server 25 and client devices 13 and 14 will be described in greater detail in conjunction with FIGS. 2-14, including several optional functions and features.

Figure 2:
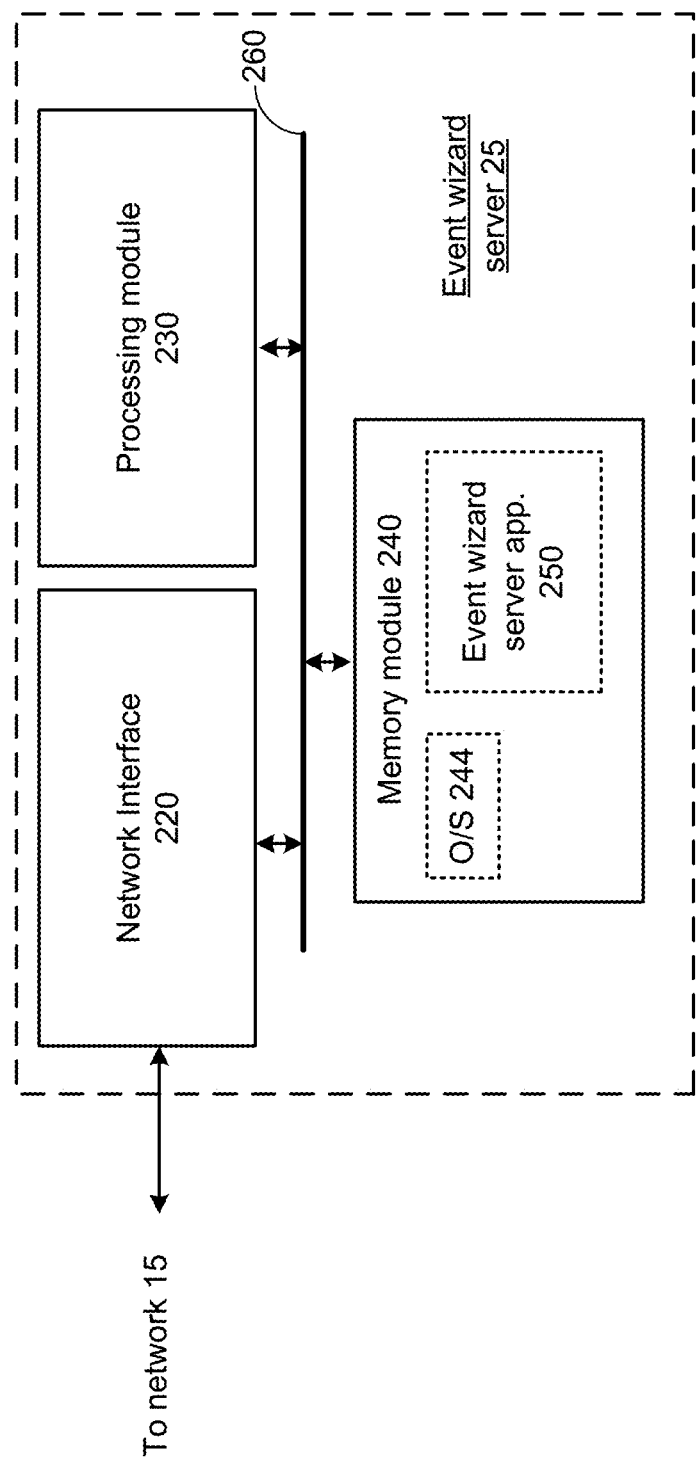
FIG. 2 presents a block diagram representation of an event wizard server 25 in accordance with an embodiment of the present invention.

FIG. 2 presents a block diagram representation of an event wizard server 25 in accordance with an embodiment of the present invention. In particular, event wizard server 25 includes a network interface such as a network card or modem for communicating with client devices such as client devices 13 or 14, other servers such as content servers 12 via network 15. The event wizard server 25 also includes a processing module 230 and memory module 240 that stores an operating system 244 such as a Linux or Microsoft operating system or other operating system as well as an event wizard server application 250.

The processing module 230 can be implemented via a single processing device or a plurality of processing devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory 240. The memory can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 260, other architectures are possible including additional data buses and/or direct connectivity between one or more elements. Further, the event wizard server 25 can include one or more additional elements that are not specifically shown.

In operation, at least one processor of the processing module 230 executes the event wizard server application 250 to bidirectionally communicate event planning data with a user of a client device, such as client device 13 or 14 via the network interface 220 and the network 15. In an embodiment, the event wizard server application 250 includes hardware, software or firmware such as an expert system, search engine, agent program, web crawler and/or database to identify and retrieve various event options for presentation to users. In particular, the event wizard server application 250 operates to filter options for presentation to the user based on one or more factors such as event budget, event size and location so that the user is presented with options that are most germane to the planned event. The event planning data includes information such as:

Event type menu data generated by the event wizard server application 250 and sent to the client device that includes a plurality of general event types and a plurality of specific events;

Event type selection data received from the client device that indicates an event type based on the event type menu data;

Event size selection data received from the client device that indicates an event size;

Location data received from the client device;

Event budget menu data generated by event wizard server application 250 and sent to the client device that includes a plurality of budget options that are based on the event selection data, the event size selection data and the location data;

Event budget selection data received from the client device that indicates a selected one of the plurality of budget options;

Event budget data generated by the event wizard server application 250 in response to the selected one of the plurality of plurality of budget options and sent to the client device;

Event option menu data that includes a plurality of event options that are generated by the event wizard server application 250 based on the event selection data and the location data, wherein the event options correspond to at least one of: an event venue, an event caterer, an event invitation, event entertainment and event transportation, wherein the event option menu data are sent to the client device;

Event option selection data received from the client device that selects at least one event option based on the event option menu data;

Event invitee menu data generated by the event wizard server application 250 and sent to the client device that includes contact data corresponding to the user that is retrieved by the event wizard server from an external location via the network interface; and Event invitee selection data received from the client device that indicates a plurality of invitees based on the event invitee menu data.

The operation of event wizard server 25 in generating and responding to event planning data will be described in greater detail in conjunction with FIGS. 3-14, including several optional functions and features.

Figure 3:
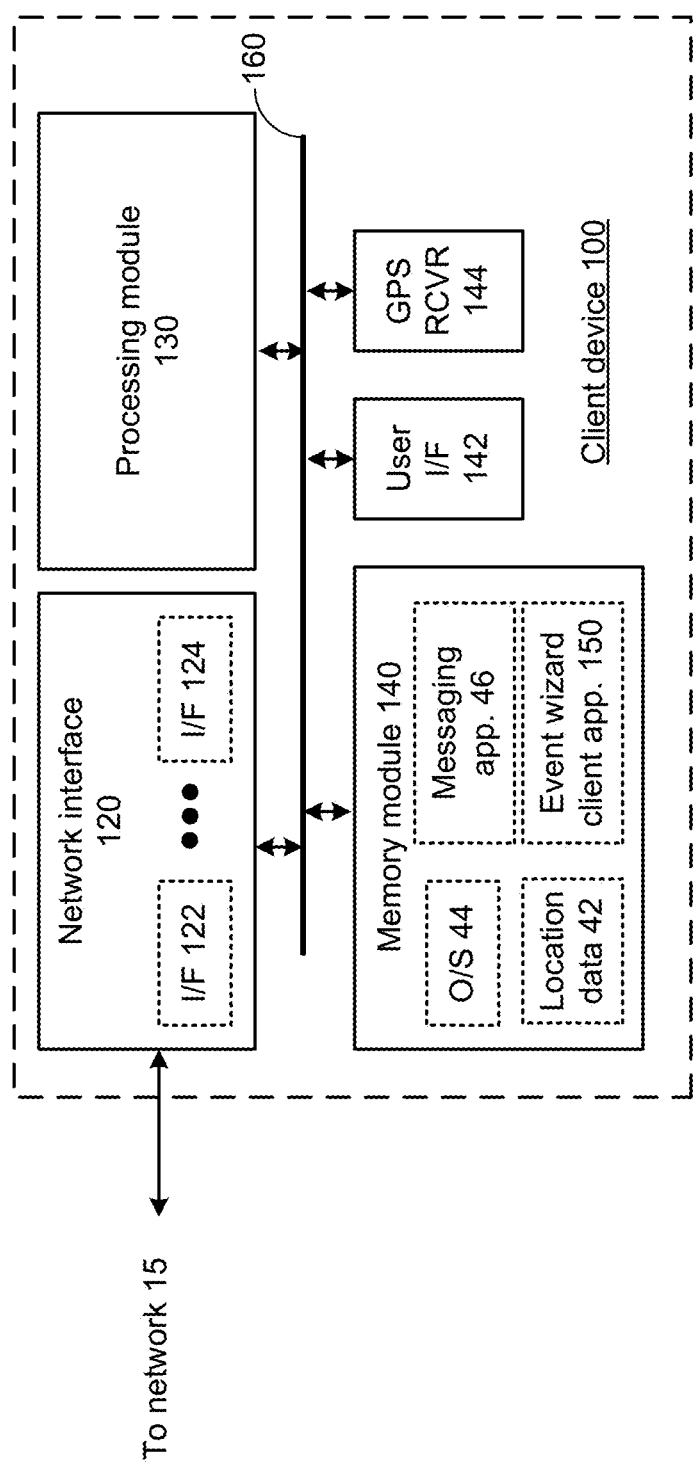
FIG. 3 presents a block diagram representation of a client device 100 in accordance with an embodiment of the present invention.

FIG. 3 presents a block diagram representation of a client device 100 in accordance with an embodiment of the present invention. In particular, a client device 100, such as mobile terminal 13, personal computer 14 or other client device such as a personal digital assistant, tablet, or smartphone is presented. The client device 100 includes a network interface 120 having one or more interfaces (122, 124 . . . ). Examples of interfaces (122, 124 . . . ) include wireless interfaces such as a 3G, 4G or other wireless telephony transceiver, a Bluetooth transceiver, a WiFi transceiver, UltraWideBand transceiver, WIMAX transceiver, ZigBee transceiver or other wireless interface. Examples of interfaces (122, 124 . . . ) further include wired interfaces such as a Universal Serial Bus (USB) interface, an IEEE 1394 Firewire interface, an Ethernet interface or other network card or modem for communicating with event wizard server 25, or other servers such as content servers 12 via network 15. The client device 100 also includes a user interface such as a display device, touch screen, key pad, touch pad, thumb wheel, one or more buttons, a speaker, a microphone, an accelerometer, gyroscope or other motion sensor, or other interface devices that provide information to a user of the client device 100 and that generate data in response to the user's interaction with the client device 100.

The client device 100 also includes a processing module 130 and memory module 140 that stores an operating system 44 such as a Linux-based operating system, a Microsoft personal computer or mobile operating system, an Android operating system, an Apple mobile or personal computer operating system or other operating system. The memory module 140 also stores location data 42 corresponding to the location of the client device 100 generated via user interaction with user interface 142, via optional Global Positioning System (GPS) receiver 144, or gathered via a wireless network such as triangulation data received from a 4G network, location information from a connected access point or base station, femtocell or other location data. In addition, memory module 140 includes a messaging application 46 for communicating with other client devices such as an email application, a text, instant messaging or short messaging service (SMS) application or other messaging application that stored contacts data corresponding to users of other client devices that are known to the user of client device 100.

The memory module 140 also stores an event wizard client application 150 that is prestored in the memory module, loaded via disk or downloaded to the memory module via network interface 120. The event wizard client application can be a general browser application such as Mozilla, Google Chrome, Safari, Internet Explorer or other general web browser or an application that is customized to operate in conjunction with event wizard server 25 in conjunction with the exchange of event planning data.

The processing module 130 can be implemented via a single processing device or a plurality of processing devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory of memory module 140. The memory can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 160, other architectures are possible including additional data buses and/or direct connectivity between one or more elements. Further, the client device 100 can include one or more additional elements that are not specifically shown.

The operation of client device in generating and responding to event planning data will be described in greater detail in conjunction with FIGS. 4-14, including several optional functions and features.

Figure 4:
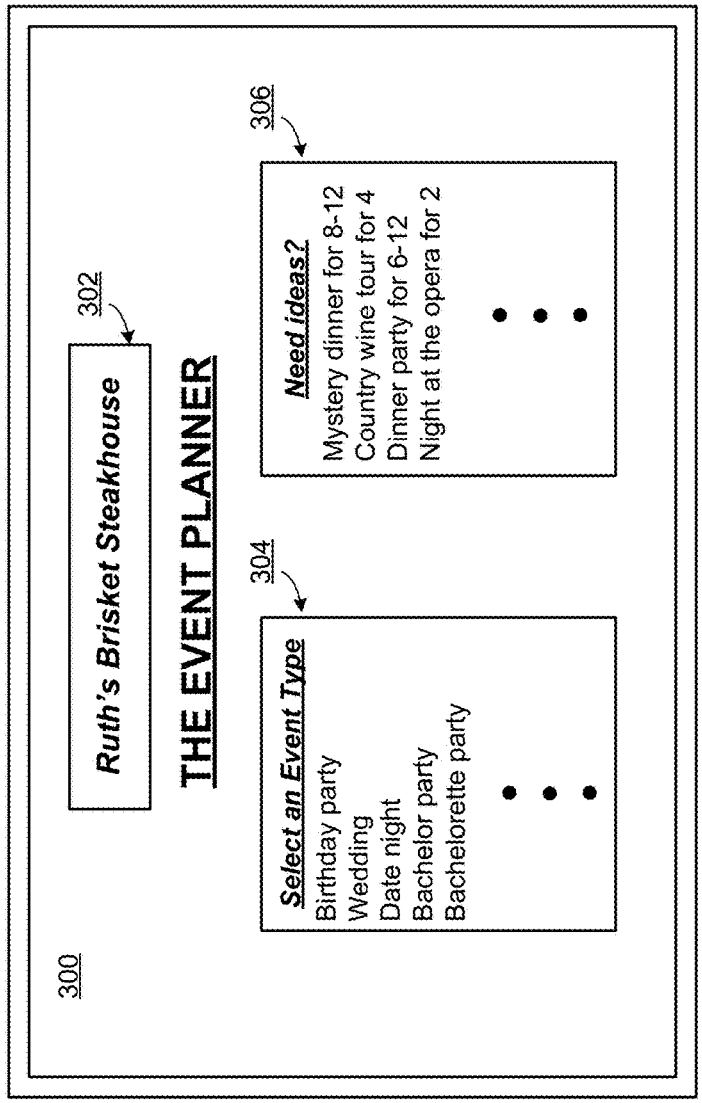
FIG. 4 presents a graphical representation of screen display 300 in accordance with an embodiment of the present invention.

FIG. 4 presents a graphical representation of screen display 300 in accordance with an embodiment of the present invention. In particular, a screen display 300 of user interface 142 of client device 100 is presented as generated by the event wizard client application 150 in response to event planning data from the event wizard server application 250. The screen display 300 includes event type menu data that includes a plurality of general event types 304 that can be planned based on a plurality of specific events 306. The specific events 306 differ from the general events 304 by being preplanned with more limited choices. An example of a specific event is a mystery dinner at a local dinner theatre for 8-12, where the only choices are the number of people to attend and a seating category (basic or premium). Specific events 306 are presented to cater to user of client device 100 that wish to forego much of the customization of a more complicated event.

In operation, the user selects either a general event type 304 or specific event 306 by clicking, touching or highlighting a particular selection. The user interface 142, in response to the actions of the user to select a general event type or a specific event, generates event type selection data that indicates the selected event type. This event type selection data is sent to the event wizard server 25 via network interface 120.

Display screen 300 includes one or more advertisements such as banner ad 302 or other advertisements. In an embodiment of the present invention, event wizard server 25 includes either a specific advertisement in the event planning data sent to client device 100 or links to a content server 12, such as a remote ad server that supplies ads to the client device 100 for inclusion in the display screen 300. Examples of such remote ad servers include Google ads, Doubleclick ads, etc. When a user selects an advertisement 302, advertising data is retrieved via a universal resource locator (URL), a custom URL or other links via the network 15. In the example shown for "Ruth's Brisket Steakhouse", when the ad 302 is selected by the user, information pertaining to the menu, location, hours of operation, etc., are retrieved from a remote server and presented for display on the user interface 142 of client device 100.

Figure 5:
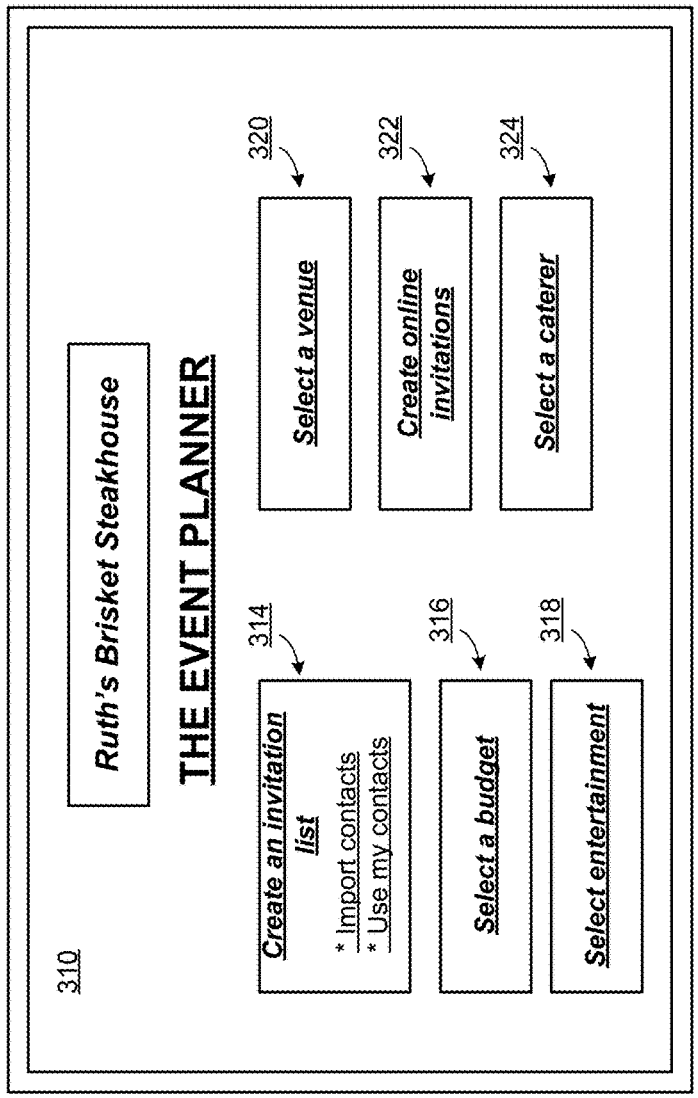
FIG. 5 presents a graphical representation of screen display 310 in accordance with an embodiment of the present invention.

FIG. 5 presents a graphical representation of screen display 310 in accordance with an embodiment of the present invention. In particular, a screen display 310 of user interface 142 of client device 100 is presented as generated by the event wizard client application 150 in response to event planning data from the event wizard server application 250. Display screen 310 presents event option menu data that includes a plurality of event options including the option 314 to create an invitation list, an option 316 to select a budget, an option 318 to select entertainment, an option 320 to select a venue, an option 322 to create online invitations, and an option 324 to select a caterer. It should be noted that while particular options are presented, other options such as a selection of transportation, event supplies, equipment rentals and other event options can be presented in a similar manner.

In the example shown, the each of the options 314, 316, 318, 320, 322, and 324 provide a particular category of event options that are selectable and provide links to other menus that provide additional event options corresponding to the specific category. In an embodiment, the specific event option categories that are presented and/or the event options that are presented within a category are generated by the processing module of the event wizard server 25 based on the event selection data that indicates the type of event selected and optionally based on location data received by the client device 100 that indicates the location of the client device. In this fashion, the event categories can change based on the type of event, with different categories being presented for a Dinner Party as opposed to a Wedding, for example. Further specific choices for event venues, entertainment choices, caterers, etc., can be presented that are local to or otherwise in the vicinity of the user of client device 100 or otherwise in a location selected by the user of client device 100.

Also presented in this example, option 314 includes a first option that is selectable via the user of client device 100 to use local contacts data, such as the contacts data from the messaging application 46 of the client device 100. A second option is presented to allow the wizard or to import contacts from a remote location, such as a social media server, such as Facebook, LinkedIn or Twitter or a web-based messaging service such as Gmail, Yahoo mail, etc. that has an account associated with the user. In this fashion, the user of client device can create an invitation list for the event by starting from an existing list of contacts for the user.

Figure 6:
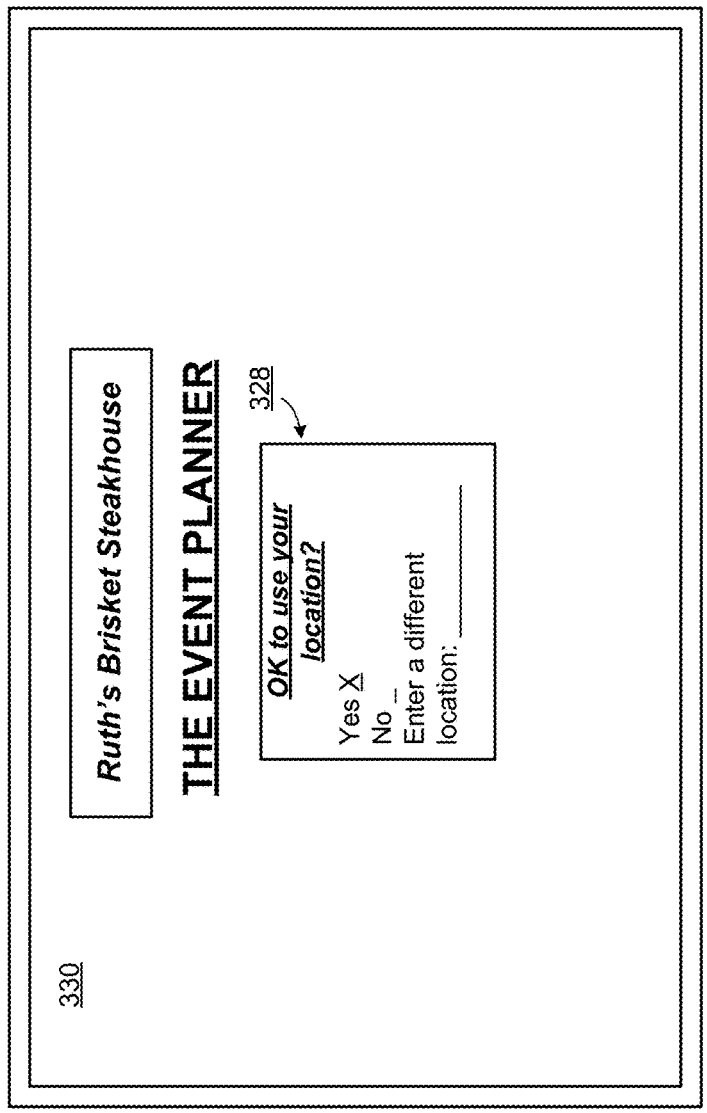
FIG. 6 presents a graphical representation of screen display 330 in accordance with an embodiment of the present invention.

FIG. 6 presents a graphical representation of screen display 330 in accordance with an embodiment of the present invention. In particular, a screen display 330 of user interface 142 of client device 100 is presented as generated by the event wizard client application 150 in response to event planning data from the event wizard server application 250. In this example, event planning data is presented for display 328 that queries the user of client device regarding the use of location data. For example if the user responds by selected "yes" as indicated, stored location data 42 corresponding to the location of the client device 100 generated via GPS receiver 144, or gathered via a wireless network such as triangulation data received from a 4G network, location information from a connected access point or base station, femtocell or other stored location data 42 of the client device is used, as previously discussed, to guide the event wizard server 25 in presenting event options that are near the user of client device 100. As further shown, the user of client device 328 is given the option to enter a different location, for example by zip code, zip+4, GPS coordinates, street address or other location in order to guide the event wizard server 25, in situations where the user does not wish to use location data 42, location data 42 is absent or the event will be at a different location than the location reflected by location data 42.

In the example shown, when the user selects that the location can be used, the event wizard client application retrieves the location data 42 and sends the location data 42 to the event wizard server 25 via network interface 120 and network 15. When the user enters different location data, this alternative location data is sent to the event wizard server 25 in a similar fashion.

Figure 7:
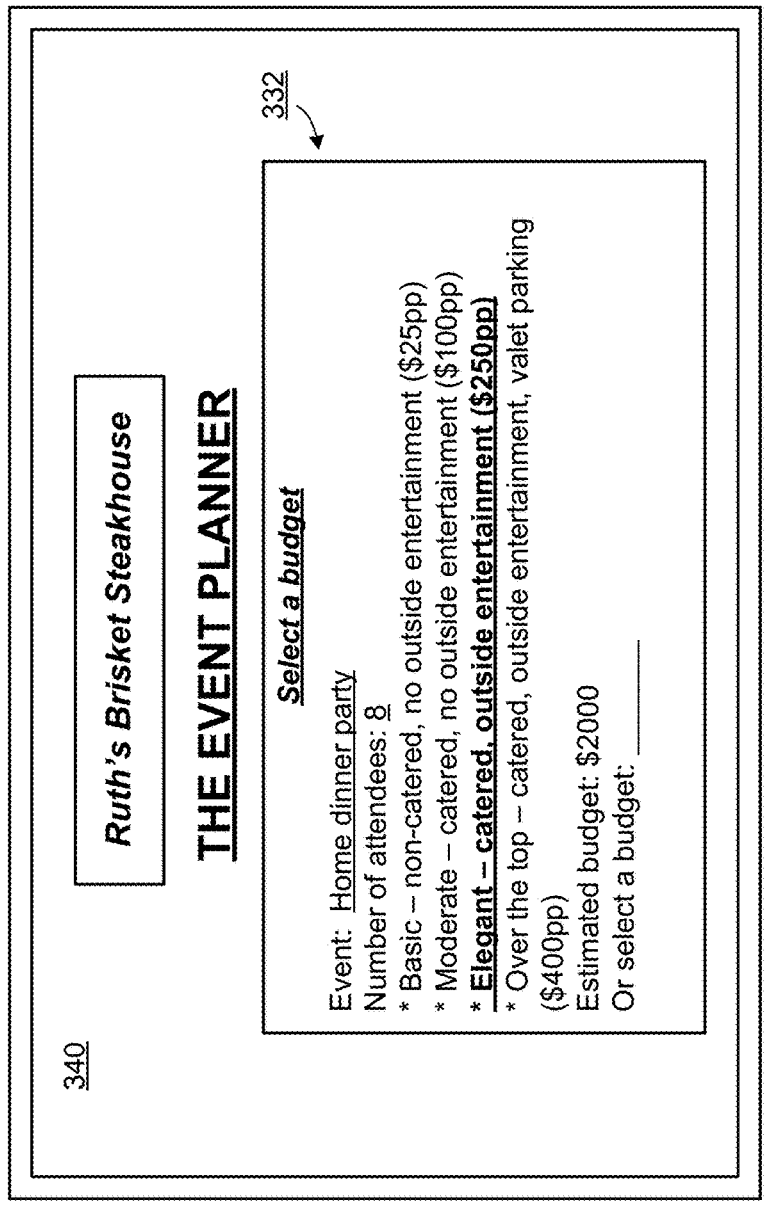
FIG. 7 presents a graphical representation of screen display 340 in accordance with an embodiment of the present invention.

FIG. 7 presents a graphical representation of screen display 340 in accordance with an embodiment of the present invention. In particular, a screen display 340 of user interface 142 of client device 100 is presented as generated by the event wizard client application 150 in response to event planning data from the event wizard server application 250. In the example shown, the menu 332 presents event size selection data received from user interface 142 of client device 100 indicating that there will be 8 attendees. While the example shown presents the size of event by a single number, in other embodiments, ranges of numbers can be employed. The event size selection data can be used by the event wizard server application and/or the event wizard client application in the budgeting process, and otherwise to filter event venues, entertainment options, caterers and other event options that may be particular to events of particular sizes.

In addition, the menu 332 presents event budget menu data that includes a plurality of budget options that are based on the event selection data, the event size selection data and the location data. In the example shown, the menu 332 reflects that a particular event type, "home dinner party" has been selected and presents various budget options (basic, moderate, elegant and over the top) for this event type, with per person (pp) costs particular to the location and the size of the event. In response to menu 332, the user interface 142 generates event budget selection data that indicates a selected one of the plurality of budget options (in this case "elegant"). Event budget data is generated and displayed in response to the selected one of the plurality of budget options that reflects the budget. In this example, with 8 attendees and a $250 pp price, the budget is estimated at $2000.

As the event wizard continues, various event options are presented to the user via the user interface 142 that displays costs associated with additional event options. The event wizard server application and/or the event wizard client application operate to update the event budget data as new options are selected to present the estimated costs of the event. In one example of operation, the event budget data is updated and displayed each time the event options are selected and modified in order to provide a snapshot of the updated cost. In this fashion, the user of client device 100 can plan the event based on the costs of various options—with an eye for the overall budget.

Figure 8:
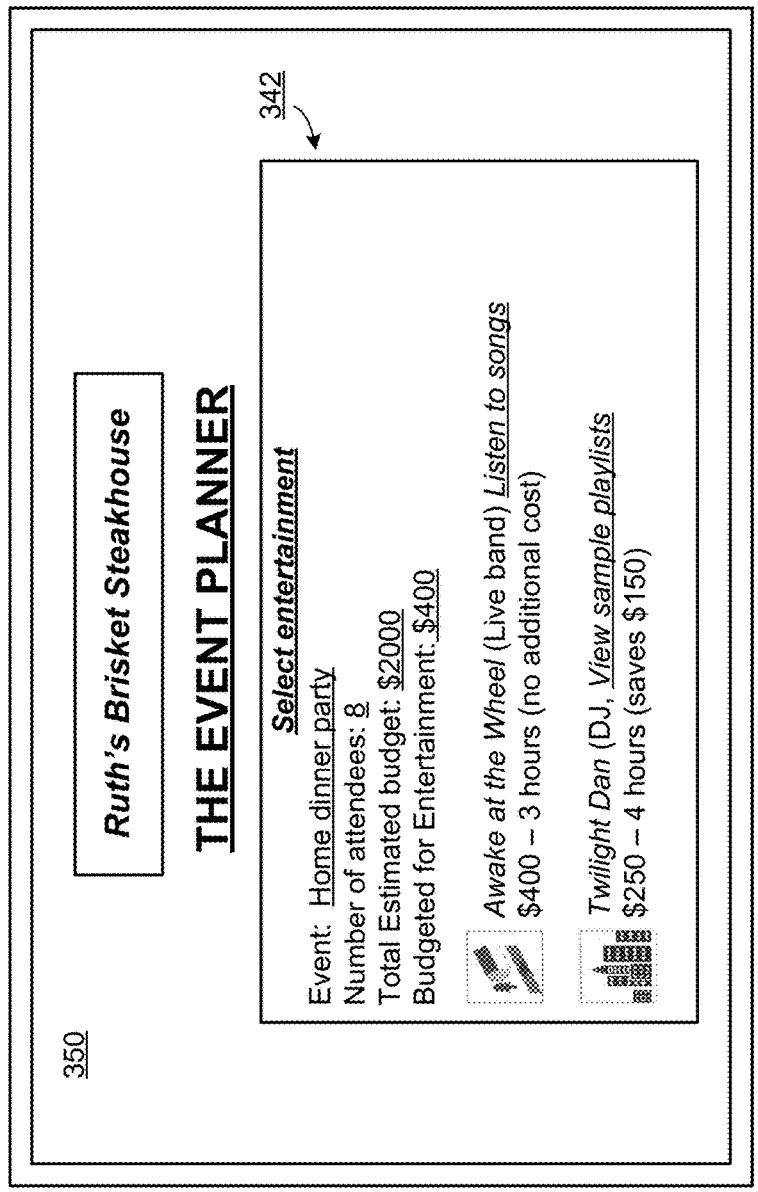
FIG. 8 presents a graphical representation of screen display 350 in accordance with an embodiment of the present invention.

FIG. 8 presents a graphical representation of screen display 350 in accordance with an embodiment of the present invention. In particular, a screen display 350 of user interface 142 of client device 100 is presented as generated by the event wizard client application 150 in response to event planning data from the event wizard server application 250. Menu 342 is presented that includes event option menu data pertaining to entertainment options. In this example, for two entertainment options "Awake at the Wheel" and "Twilight Dan" are presented for the selected event, the home dinner party discussed in conjunction with the example of FIG. 7. As previously discussed, the particular options presented can be generated by the event wizard server application based on the location data, and the event selection data. In this example, entertainment options that may be appropriate to a home dinner party and that are in the vicinity indicated by the location data are selected by the event wizard server application 250 to be presented to the user.

In a further embodiment, screen display 350 may also contain another section requesting the user to provide feedback, in the form of a rating and/or comment, on entertainment from an event they previously hosted. If the user optionally provides feedback based on their previous experience, the information is stored on the event wizard server application 250. Additionally, screen display 350 may contain a further section suggesting entertainment that other users and/or invitees have given positive feedback, provided by the event wizard client application 150. The event wizard server application 250 may also import entertainment feedback from websites such as Yelp, Urbanspoon, and other similar resources. While feedback system is described for display 350 of the Select Entertainment option, it may also be available for the Select a venue and Select a caterer options as shown as 320 and 324, respectively, in FIG. 5.

The user interface 142 responds to actions of the user of client device 100 to generate event option selection data that indicates the user's selection of particular event option menu data. In the example shown, the total estimated budget for the event of $2000 is shown as well as the particular budget for this portion of the event, $400 for the entertainment. The two options shown in this example each have an associated cost that is displayed. In this case, the user can see that one choice matches the budget while the other choice, if selected, would save $150. Graphics are presented for each option and links are provided to additional information such as songs by one group and example playlists of the other. When a selection is made, the budget data in the form of the total estimated budget is updated to reflect any change in cost.

Figure 9:
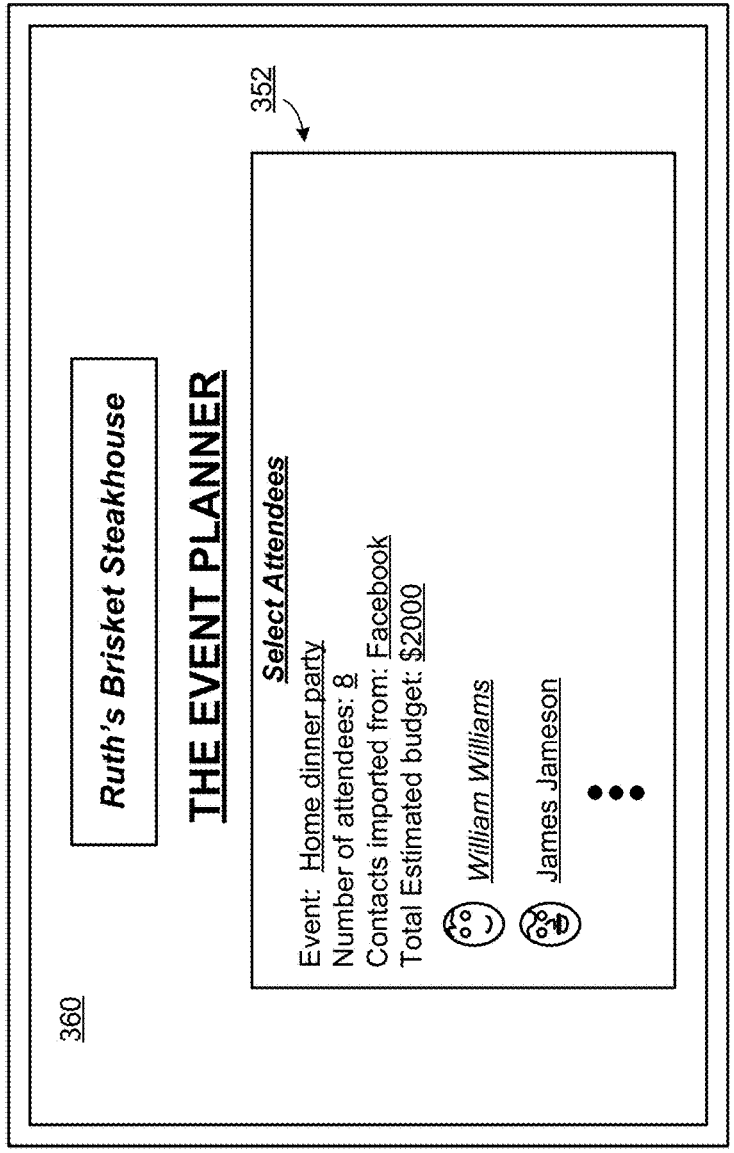
FIG. 9 presents a graphical representation of screen display 360 in accordance with an embodiment of the present invention.

FIG. 9 presents a graphical representation of screen display 360 in accordance with an embodiment of the present invention. In particular, a screen display 300 of user interface 142 of client device 100 is presented as generated by the event wizard client application 150 in response to event planning data from the event wizard server application 250. Menu 352 is presented that includes event invitee menu data generated by the event wizard server application 250 and/or the event wizard client application 150 that includes contacts data corresponding to the user that is retrieved from either messaging application or (as shown) an external location. In particular, the menu 352 reflects that the contacts presented are imported from a social media server, in this case Facebook. In an embodiment, subscription information for the social media server is obtained from the client device 100 and used to access the data for presentation to the user via user interface 142. The contacts data includes names and images of each contact as shown, but optionally includes mailing addresses, email addresses or other messaging addresses along with other contacts data.

The user interface 142 responds to actions of the user of client device 100 to generate event invitee selection data that indicates the user's selection of particular attendees to the event. In the example shown, the total estimated budget for the event of $2000 is shown as well as the expected number of attendees. As selections of attendees are made, the event budget data (in the form of the total estimated budget) is updated to reflect any change in cost; for example when a greater or fewer number of attendees are selected.

In an embodiment of the present invention, an estimated attendee percentage is applied for selected events. In this fashion, the budget for a large event such as a wedding with 250 invitees is estimated with an estimated attendance percentage of 80% to reflect that some persons that are invited may not attend. The estimated attendance percentage may be selected by the user or selected by the event wizard server application 250 based on the size of the event, the type of event and optionally location data that provides estimated attendance by locale.

In a further embodiment, an invitation server such as Evite is used by the event wizard server 25 to not only to prepare and send the invitations but to track invitee attendance data. In this embodiment, the event wizard server 25 sends the invitee selection data to the invitation server via the network interface 220. As invitee attendance data is received by the invitation server, it is forwarded to the event wizard server and used to update a status menu as to the expected number of attendees. In addition, the event budget data is updated based on the invitee acceptance data received from the invitation server.

Figure 10:
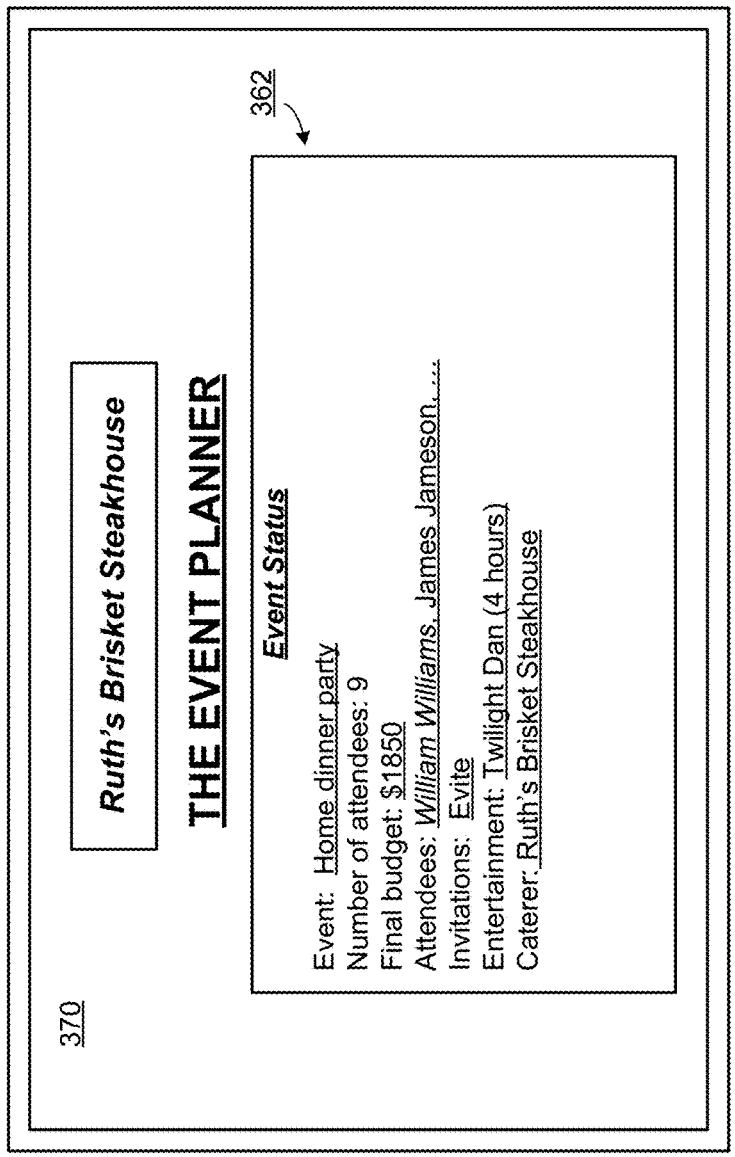
FIG. 10 presents a graphical representation of screen display 370 in accordance with an embodiment of the present invention.

FIG. 10 presents a graphical representation of screen display 370 in accordance with an embodiment of the present invention. In particular, a screen display 370 of user interface 142 of client device 100 is presented as generated by the event wizard client application 150 in response to event planning data from the event wizard server application 250. In particular a status menu 362 is presented that indicates the user's selections of various event options, invitees, the event type, etc. Before the event is finalized the user is given the option to edit the selections. As indicated in conjunction with FIG. 7 the event wizard server application 250 and/or the event wizard client application 150 operate to update the event budget data as event options and other selections are modified to present the updated estimated costs of the event in order to provide a snapshot of the updated cost.

In an embodiment, an invitation server such as Evite is used by the event wizard server 25 to not only to prepare and send the invitations but to track invitee attendance data. In this embodiment, the event wizard server 25 sends the invitee selection data to the invitation server via the network interface 220. As invitee attendance data is received by the invitation server, it is forwarded to the event wizard server 25 and used to update status menu 362 as to the expected number of attendees. In addition, the event budget data is updated based on the invitee acceptance data received from the invitation server.

Figure 11:
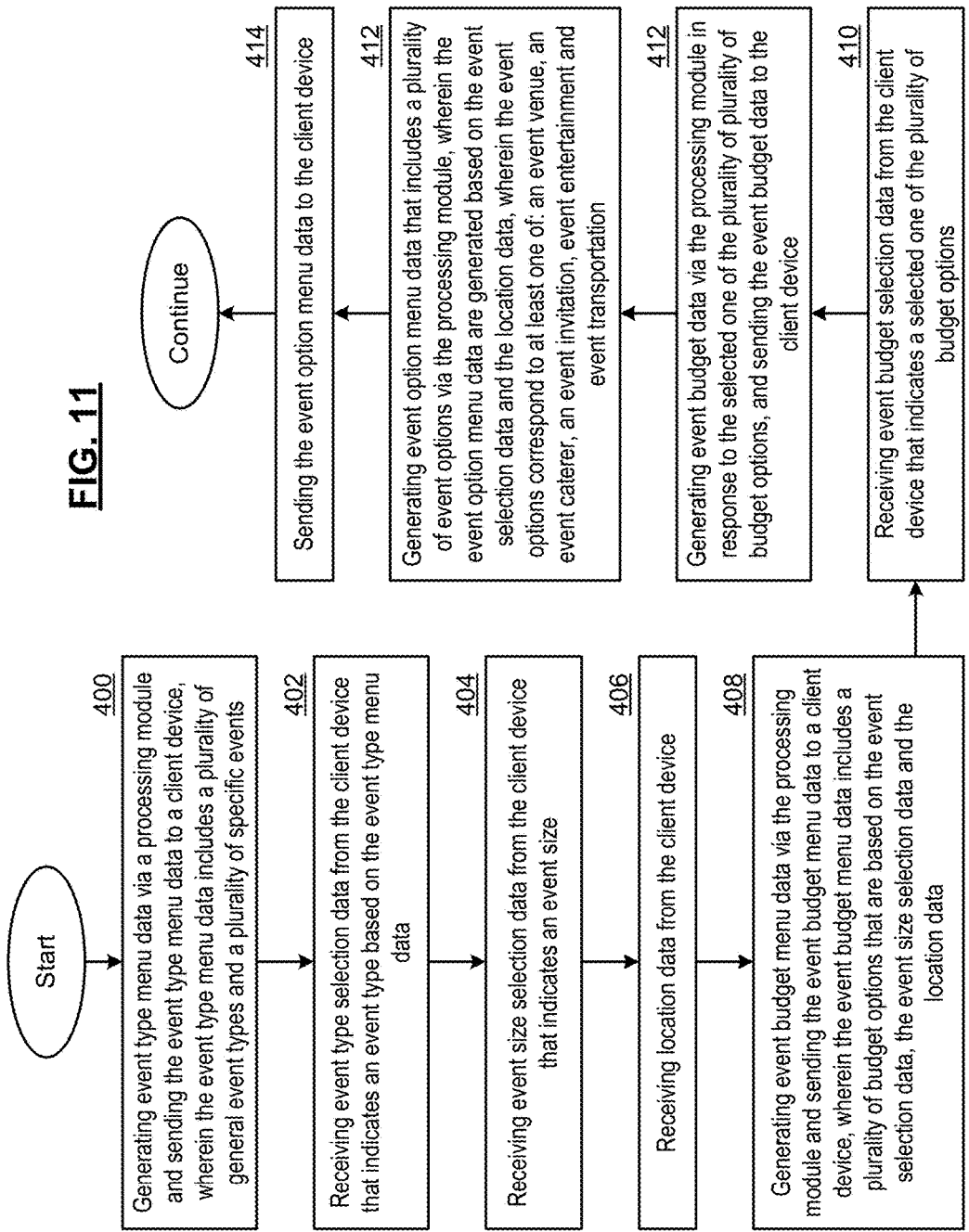
FIG. 11 presents a flowchart representation of a method in accordance with an embodiment of the present invention.

FIG. 11 presents a flowchart representation of a method in accordance with an embodiment of the present invention. In particular, a method is presented for use in conjunction with one or more functions and features described in FIGS. 1-10. In step 400, event type menu data is generated via a processing module and the event type menu data is sent to a client device, wherein the event type menu data includes a plurality of general event types and a plurality of specific events. In step 402, event type selection data is received from the client device that indicates an event type based on the event type menu data. In step 404, event size selection data is received from the client device that indicates an event size. In step 406, location data is received from the client device. In step 408, event budget menu data is generated via the processing module and the event budget menu data is sent to the client device, wherein the event budget data includes a plurality of budget options that are based on the event selection data, the event size selection data and the location data. In step 408, event budget selection data is received from the client device that indicates a selected one of the plurality of budget options. In step 410, event budget data is generated via the processing module in response to the selected one of the plurality of plurality of budget options, and the event budget data is sent to the client device. In step 412, event option menu data that includes a plurality of event options is generated via the processing module wherein the event option menu data are generated based on the based on the event selection data and the location data, wherein the event options correspond to at least one of: an event venue, an event caterer, an event invitation, event entertainment and event transportation. In step 414, the event option menu data are sent to the client device.

In an embodiment, the event option menu displays costs associated with the plurality of event options. The event size selection data can indicate an estimated number of attendees to the event.

Figure 12:
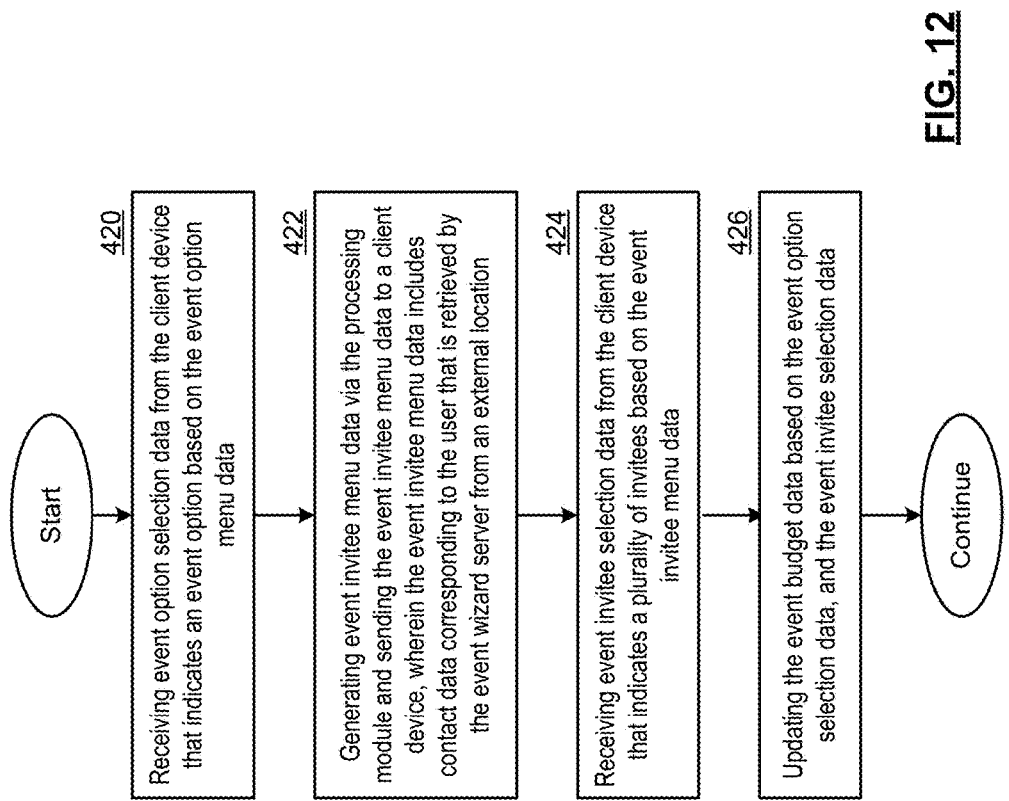
FIG. 12 presents a flowchart representation of a method in accordance with an embodiment of the present invention.

FIG. 12 presents a flowchart representation of a method in accordance with an embodiment of the present invention. In particular, a method is presented for use in conjunction with one or more functions and features described in FIGS. 1-11. In step 420, event option selection data are received from the client device that indicates selection of at least one event option based on the event option menu data. In step 422, event invitee menu data are generated via the processing module and the event invitee menu data are sent to the client device, wherein the event invitee menu data includes contact data corresponding to the user that is retrieved by the event wizard server from an external location. In step 424, event invitee selection data are received from the client device that indicates a plurality of invitees based on the event invitee menu data. In step 426, the event budget data are updated based on the event option selection data, and the event invitee selection data.

In embodiments, the external location includes a social media server having an account associated with the user or the external location includes a messaging application of the client device. The event invitee menu can display the updated event budget data. The updated event budget data can further be based on an estimated attendance percentage. The processing module can send the invitee selection data to an invitation server via the network interface and the updated event budget data can further be based on invitee acceptance data received from the invitation server.

Figure 13:
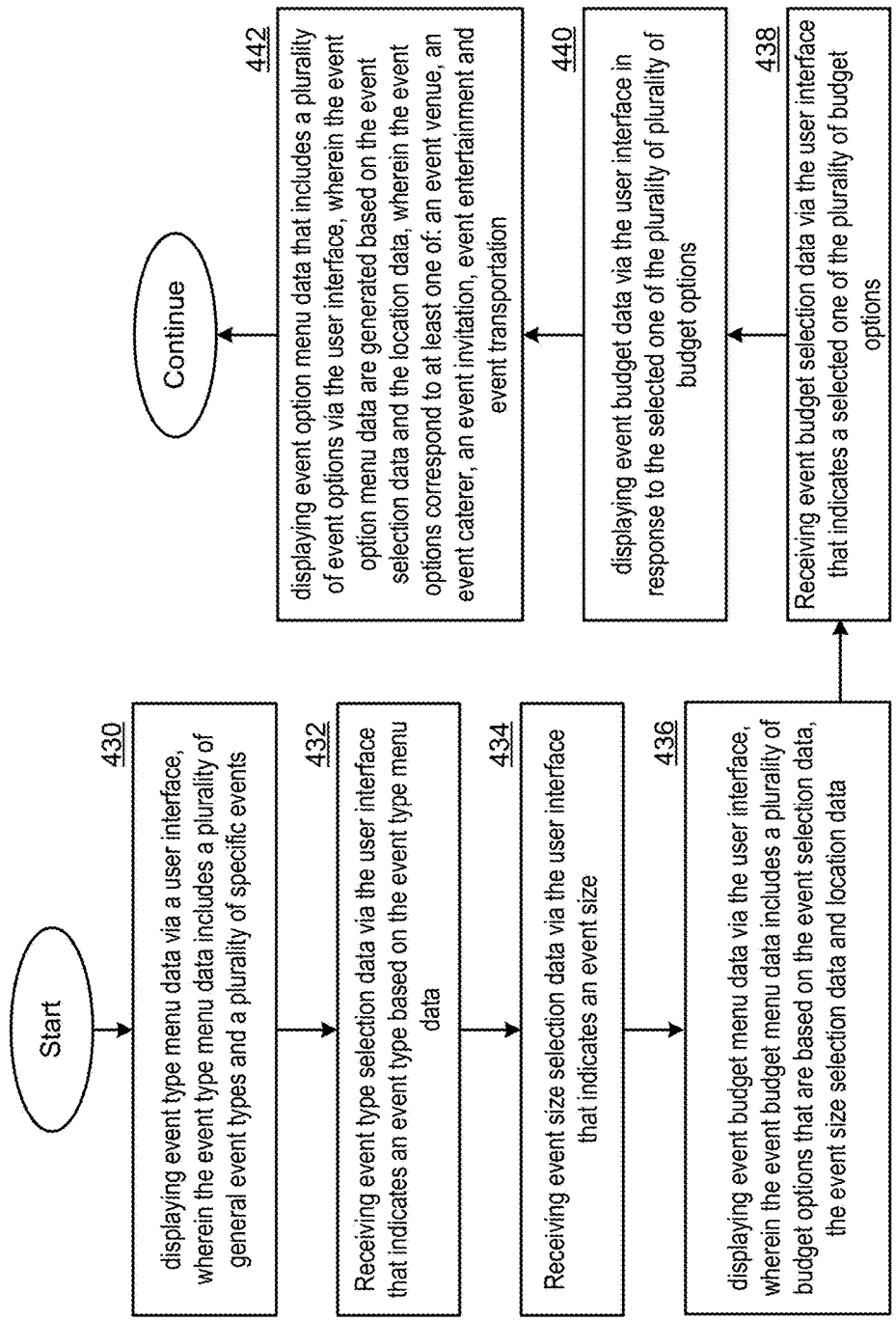
FIG. 13 presents a flowchart representation of a method in accordance with an embodiment of the present invention.

FIG. 13 presents a flowchart representation of a method in accordance with an embodiment of the present invention. In particular, a method is presented for use in conjunction with one or more functions and features described in FIGS. 1-12. In step 430, event type menu data is displayed via a user interface of the client device, wherein the event type menu data includes a plurality of general event types and a plurality of specific events. In step 432, event type selection data is received via the user interface that indicates an event type based on the event type menu data. In step 434, event size selection data is received via the user interface that indicates an event size. In step 436, event budget menu data is displayed via the user interface, wherein the event budget menu data includes a plurality of budget options that are based on the event selection data, the event size selection data and location data. In step 438 event budget selection data is received via the user interface that indicates a selected one of the plurality of budget options. In step 440, event budget data are displayed in response to the selected one of the plurality of plurality of budget options. In step 442, event option menu data are displayed via the user interface that includes a plurality of event options, wherein the event option menu data are generated based on the based on the event selection data and location data, wherein the event options correspond to at least one of: an event venue, an event caterer, an event invitation, event entertainment and event transportation.

In an embodiment, the event option menu displays costs associated with the plurality of event options. The event size selection data can indicate an estimated number of attendees to the event.

Figure 14:
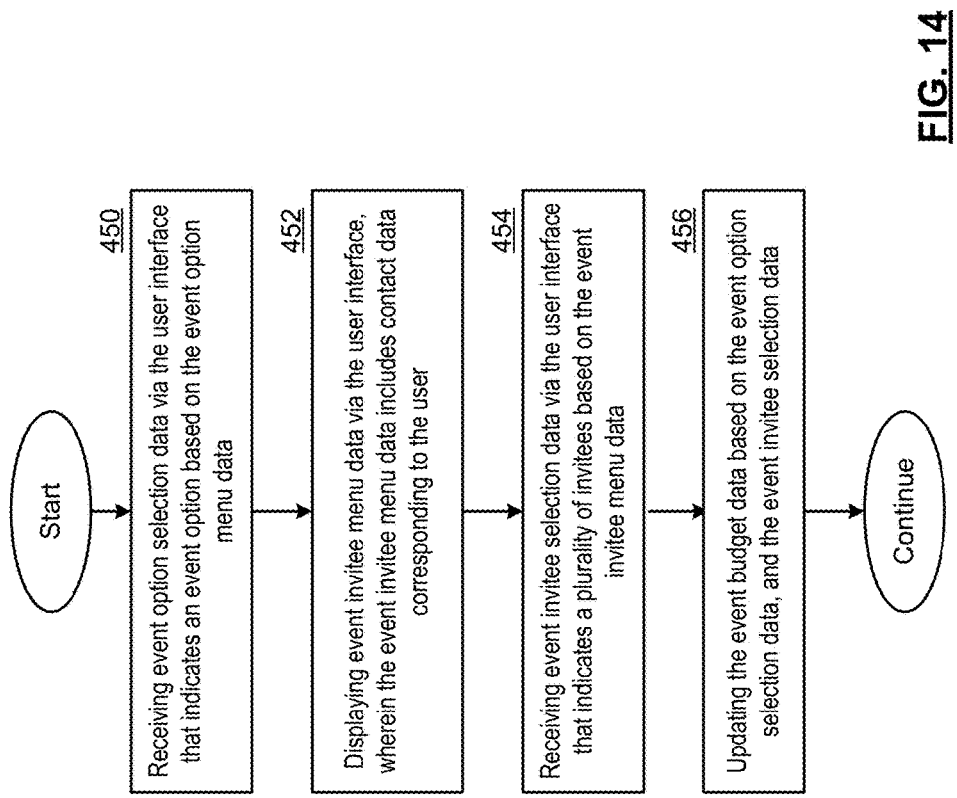
FIG. 14 presents a flowchart representation of a method in accordance with an embodiment of the present invention.

FIG. 14 presents a flowchart representation of a method in accordance with an embodiment of the present invention. In particular, a method is presented for use in conjunction with one or more functions and features described in FIGS. 1-13. In step 450, event option selection data are received via the user interface that indicates selection of at least one event option based on the event option menu data. In step 452, event invitee menu data are displayed via the user interface, wherein the event invitee menu data includes contact data corresponding to the user. In step 454 event invitee selection data are received via the user interface that indicates a plurality of invitees based on the event invitee menu data. In step 456, the event budget data are updated based on the event option selection data, and the event invitee selection data.

In embodiments, the external location includes a social media server having an account associated with the user or a messaging application of the client device. The event invitee menu can display the updated event budget data. The updated event budget data can further be based on an estimated attendance percentage. The processing module can send the invitee selection data to an invitation server via the network interface. The updated event budget data can further be based on invitee acceptance data received from the invitation server.

It should be noted that while the foregoing description focuses on a client/server mode of operation between client device 100 and event wizard server 25, some or all of the functionality of the event wizard server application 250 can be combined with the operation of event wizard client application 150 to present the functionality of the system in a single device such as mobile terminal 13 or personal computer 14. In this fashion, the mobile terminal 13 or personal computer 14 operates to generate the event planning data for display, retrieve information from content servers, etc.

Figure 15:
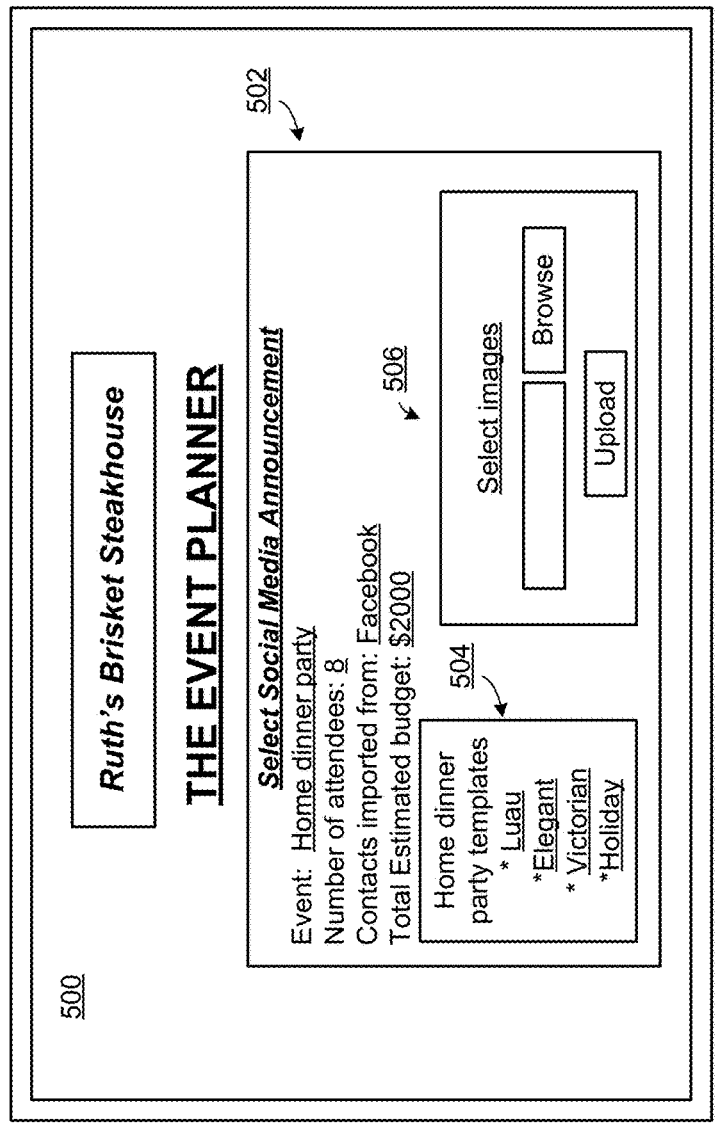
FIG. 15 presents a graphical representation of screen display 500 in accordance with an embodiment of the present invention.

FIG. 15 presents a graphical representation of screen display 500 in accordance with an embodiment of the present invention. In particular, a screen display 500 of user interface 142 of client device 100 is presented as generated by the event wizard client application 150 in response to event planning data from the event wizard server application 250 and user-provided invitee selection data. Display screen 500 presents invitation option menu data that includes a plurality of invitation options including the option 504 to choose an invitation template and an option 506 to upload an image. It should be noted that while particular options are presented, other options such as a selection of social media delivery method (including Facebook, Twitter, Google+, LinkedIn, E-mail, etc.) via a social media server such social media server 10, event details, event description, invitee suggestions (items invitees may need to bring, attire, directions to event or method of attaining directions, etc.) and other invitation options can be presented in a similar manner.

In an embodiment, the event wizard client application 150 responds to selections of the user to select date data and time data corresponding to one or more dates and times for the event. The invitation may also include the option to be a non-recurring or a recurring event. For example, the event may occur every Thursday at 7 p.m. or the same event may be hosted on multiple occasions without a regular day and time. This embodiment may also include the ability to automatically send out the invitation based on user-input dates and times indicated by the date data and the time data. For example, the user may individually select each date on which the event will occur at the time of making the original invitation 500 or at a later date. Further, the dates can automatically be chosen by the event wizard server application 250 based on a user-input time period and a recurring day and time. Additionally, based on invitees' user-input calendars, event wizard server application 250 may provide a greatest availability date and/or time suggestion in which most chosen invitees will be available for an event. These calendars may be input directly via the calendar application stored on event wizard server application 250 or they may be imported from various calendar applications (Google calendar, Facebook, etc.).

In operation, the event wizard client application 150 responds interactively with two event planning menus and options from the event wizard server application 250 and user-provided theme and invitee selection data, image data and other user generated selections to design a social media announcement. In an embodiment, the event wizard client application 150 operates in conjunction with the event wizard server application 250 to preview the announcement and further to edit the social media announcement, prior to uploading the social media announcement as a posting on the selected social media site, either directly from the event wizard client application 150 or via the event wizard server application 250.

While not specifically shown, addition display screens generated by generated by the event wizard client application 150 in response to event planning data from the event wizard server application 250 and can include a calendar input/import screen for syncing calendars with invitees and/or viewing dates of availability of potential invitees. Other optional screens allow the creation and posting of "save the date" announcements that are separate from the social media announcement, reminders to invitees closer to the date of the event, post party announcements including uploaded pictures from the event. Pictures from the event may or may not be kept private to all but invitees to the event, based on privacy data specified in the event planning data.

Figure 16:
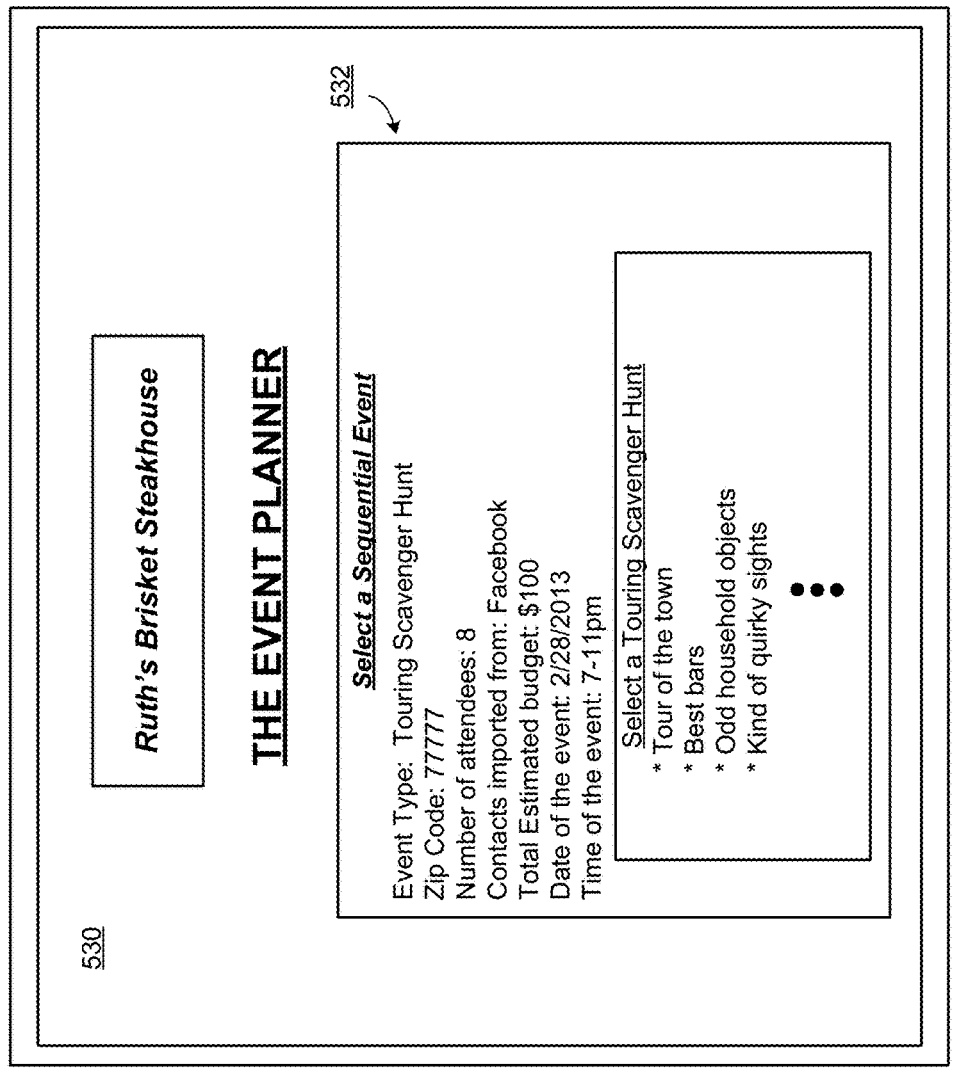
FIG. 16 presents a graphical representation of screen display 530 in accordance with an embodiment of the present invention.

FIG. 16 presents a graphical representation of screen display 530 in accordance with an embodiment of the present invention. In particular, a screen display 530 of user interface 142 of client device 100 is presented as generated by the event wizard client application 150 in response to event planning data from the event wizard server application 250 and user-provided selection data. Display screen 530 presents a selection menu 532 corresponding to a sequential task-oriented event, such as a touring scavenger hunt, pub scrawl or other sequential tour.

As shown, the selection menu 532 reflects user selection of a particular event type (e.g. touring scavenger hunt), a zip code (e.g. 77777, a number of attendees (e.g. 8) and contacts for the attendees imported from a social media site (e.g. Facebook) and an estimated budget (e.g. $100). The user is presented with a plurality of options for the event, based on at least the location and the event type. The options available for this location and price (Tour of the town, Best Bars, Odd household objects, Kind of quirky sights, . . . ) are presented. These options are selectable to provide further information regarding each possible event and further can be finally selected as the particular event to be implemented. In an embodiment, the event wizard client application 150 responds to selections of the user to select date data and time data corresponding to one or more dates and times for the event.

It should be noted that while particular options are presented, other options such as a selection of social media delivery method (including Facebook, Google+, LinkedIn, E-mail, etc.) via a social media server such as social media server 10, event details, event description, invitee suggestions (items invitees may need to bring, attire, directions to event or method of attaining directions, etc.), a scavenger hunt time limit, an option to form teams and a method of team formation, and other invitation options can be presented in a similar manner. Once the event is selected and a time and date are selected, the event is implemented in conjunction with the event planning data that is generated including the social media delivery method. In particular, the event can be implemented via the social media server 10, event wizard server 25 and/or an event server application running on a server or otherwise through interface with the social media server 10.

Figure 17:
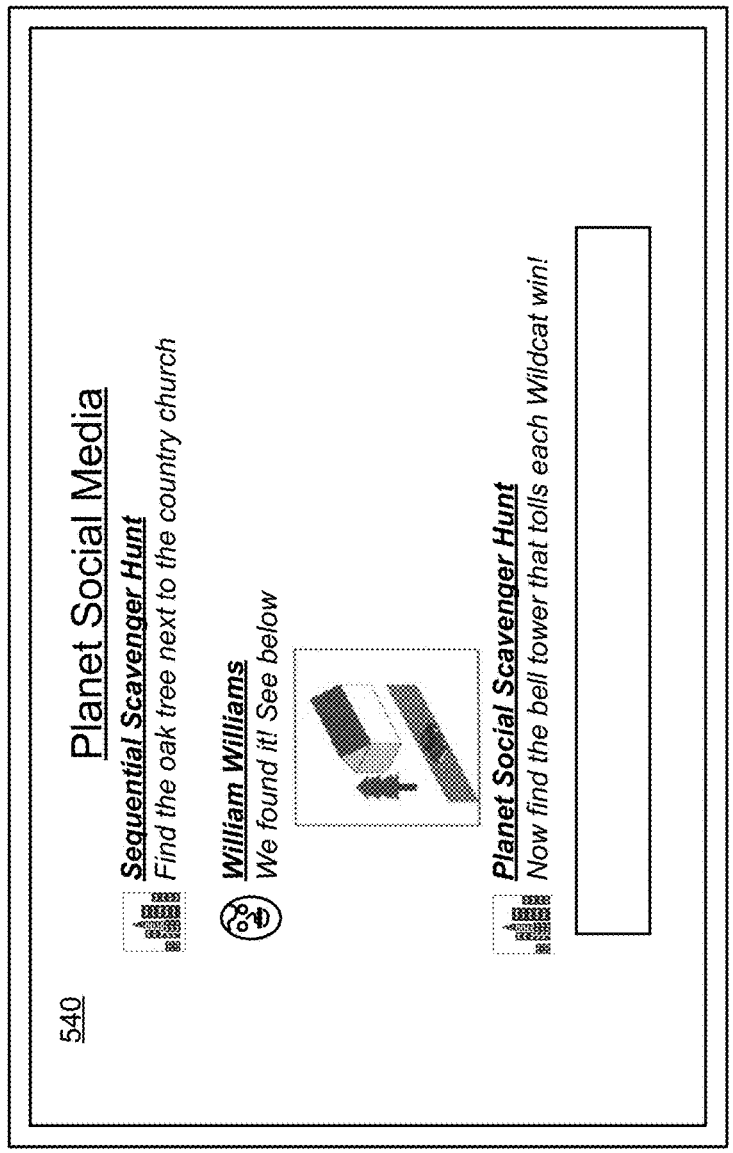
FIG. 17 presents a graphical representation of screen display 540 in accordance with an embodiment of the present invention.

FIG. 17 presents a graphical representation of screen display 540 in accordance with an embodiment of the present invention. In particular, a screen display 540 of user interface 142 of client device 100 is presented as generated by a event server application running on the social media server 10, event wizard server 25 or an event server application running on another server or otherwise through interface with the social media server 10.

Display screen 540 presents an example of a scavenger hunt event hosted through a social media site represented as Planet Social Media, however, other social media sites such as Facebook, Twitter, Google+, LinkedIn, etc., a personalized blog, or other site scan be modified to include the functionality of this particular feature.

In an embodiment of the present invention, a touring scavenger hunt refers to a sequential task-oriented event that involves a sequential search for specific places or items as provided by the event server application in accordance with the event. Display 540 shows an example screen shot presented in implementing the touring scavenger hunt via the social media site. At the date and time of the event, the event server application operates in conjunction with the social media server 10 to provide the first place or item on the list to be found. The information corresponding to this first post is generated based on event planning data corresponding to the specific event generated via from the event wizard server application 250 and is posted or addressed to a user input list of some or all invitees, based on invitee attendance data. The first item shown is to "find the oak tree next to the country church" that is posted in the social media site for review by all or selected ones of the attendees to the event.

Users (attendees) then find the given item or idea and upload an image and/or comment. In the response shown, William Williams has found the place indicated and provided a picture. Upon uploading a response, the event server application operates in conjunction with the social media server 10 to provide the second item or place on the list. The challenge continues until all items are found or a user-input time limit is reached. In one embodiment, the social media server 10 can compile each invitees' and/or teams' images and/or comments into a single album or movie format for viewing. This compilation can include a time stamp for each image and/or comment. Albums from the event may or may not be kept private to all but invitees to the event, based on privacy data specified in the event planning data.

In a further embodiment, the event server application operates in conjunction with the social media server 10 to choose teams for the scavenger hunt, either randomly, in response to invitee attendance data, or based on user-input team selections. The event server application operates in conjunction with the social media server 10 to provide new items from the scavenger hunt list to all team members, even those that did not upload an image and/or comment to the previous item. Further, new items can be hidden from competing teams until competing teams complete all previous items on the scavenger hunt list. It should be noted that while particular options of interaction are presented, other options of interaction can be presented in a similar manner such as a method of interacting with opposing teams, a display of remaining time, and/or a display of the number of remaining items.

Further, while a touring scavenger hunt is presented, other sequential task-oriented events such as pub crawls, walking tours, and other events can be implemented in conjunction with social media interaction as described above. Further, while the above description has focused on sequential task-oriented events, non-sequential task-oriented events could be implemented in a similar fashion. Consider an example of a non-sequential scavenger hunt. The event server application can operate in conjunction with the social media server 10 to begin by posting, to some or all attendees, all of the items or places to be located and then providing a forum for the attendees to demonstrate, in any order, the items or places that are found.

As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A system for use with an event server, the system comprising:
    a network interface for communicating via a network;
    a memory that stores an event server application;
    a processing module, coupled to the memory and the network interface, the processing module including at least one processor that executes the event server application to bidirectionally communicate event data with a client device via the network interface, wherein the event data includes:
        event selection data received from the client device that indicates a selected one of a plurality of specific events, wherein the selected one of the plurality of specific events includes a touring scavenger hunt;
        location data, date data and time data received from the client device; and
        event invitee menu data generated by the processing module and sent to the client device that includes user contact data that is retrieved by the event server from an external location via the network interface;
    wherein the event is implemented in conjunction with the event server in conjunction with the event selection data, the location data, the date data and the time data;
    wherein the event server iteratively posts tasks corresponding to at least one of a plurality of invitees to be performed by the invitees in accordance with the touring scavenger hunt; and
    wherein the event server iteratively posts responses corresponding to at least one of the plurality of invitees to the tasks performed by the invitees in accordance with the touring scavenger hunt.

2. The system of claim 1 wherein the external location is a social media server.

3. The system of claim 1 wherein the event data further includes:
    event invitee selection data received from the client device that indicates a plurality of invitees based on the event invitee menu data.

4. The system of claim 3 wherein the processing module sends the event invitee selection data to an invitation server via the network interface.

5. The system of claim 1 wherein the event server iteratively compiles an album corresponding to the touring scavenger hunt.

6. The system of claim 5 wherein the album contains the responses corresponding to at least one of a plurality of invitees to the tasks performed by the invitees in accordance with the touring scavenger hunt.

7. The system of claim 1 wherein the event data includes event type menu data generated by the processing module and sent to the client device that includes the plurality of specific events.

8. The system of claim 1 wherein the external location includes a messaging application.

9. A method comprising:
    bidirectionally communicating event data with a client device via a network interface of an event server having a processing module and a memory, wherein the event data includes:
        event selection data received from the client device that indicates a selected one of a plurality of specific events, wherein the selected one of the plurality of specific events includes a touring scavenger hunt;
        location data, date data and time data received from the client device; and
        event invitee menu data generated by the event server and sent to the client device that includes user contact data that is retrieved by the event server from an external location via the network interface;
    wherein the event is implemented in conjunction with the event server in conjunction with the event selection data, the location data, the date data and the time data;
    wherein the event server iteratively posts tasks corresponding to at least one of a plurality of invitees to be performed by the invitees in accordance with the touring scavenger hunt; and
    wherein the event server iteratively posts responses corresponding to at least one of the plurality of invitees to the tasks performed by the invitees in accordance with the touring scavenger hunt.

10. The method of claim 9 wherein the event data further includes:
    event invitee selection data received from the client device that indicates a plurality of invitees based on the event invitee menu data.

11. The method of claim 9 wherein the event server iteratively compiles an album corresponding to the touring scavenger hunt.

12. The method of claim 11 wherein the album contains the responses corresponding to at least one of a plurality of invitees to the tasks performed by the invitees in accordance with the touring scavenger hunt.

13. The method of claim 9 wherein the event data includes event type menu data generated by the event server and sent to the client device that includes the plurality of specific events.

14. The method of claim 9 wherein the external location is a social media server.

15. A system for use with an event server comprising:
    a network interface for communicating via a network;
    a memory that stores an event server application;
    a processing module, coupled to the memory and the network interface, the processing module including at least one processor that executes the event server application that bidirectionally communicates event data with a client device via the network interface, wherein the event data includes:
        event selection data received from the client device that indicates a selected one of a plurality of specific events, wherein the selected one of the plurality of specific events includes a touring scavenger hunt;

location data, date data and time data received from the client device; and event invitee menu data generated by the processing module and sent to the client device that includes user contact data that is retrieved by the event server from an external location via the network interface;

wherein the event is implemented in conjunction with the event server in conjunction with the event selection data, the location data, the date data and the time data;

wherein the event server iteratively posts tasks corresponding to at least one of a plurality of invitees to be performed by the invitees in accordance with the touring scavenger hunt; and wherein the event server iteratively posts responses corresponding to at least one of the plurality of invitees to the tasks performed by the invitees in accordance with the touring scavenger hunt.

16. The system of claim 15 wherein the event data further includes:

event invitee selection data received from the client device that indicates a plurality of invitees based on the event invitee menu data.

17. The system of claim 15 wherein the external location is a social media server.

18. The system of claim 15 wherein the external location includes a messaging application.

19. The system of claim 15 wherein the event server iteratively compiles an album corresponding to the touring scavenger hunt.

20. The system of claim 19 wherein the album contains the responses corresponding to at least one of a plurality of invitees to the tasks performed by the invitees in accordance with the touring scavenger hunt.

* * * * *